United States Patent [19]

Teterwak

[11] Patent Number: 5,837,947
[45] Date of Patent: Nov. 17, 1998

[54] METHOD AND APPARATUS FOR REDUCING NOISE IN AN ELECTROSTATIC DIGITIZING TABLE

[75] Inventor: Jerzy A. Teterwak, Colorado Springs, Colo.

[73] Assignee: Symbios, Inc., Fort Collins, Colo.

[21] Appl. No.: 599,574

[22] Filed: Feb. 9, 1996

[51] Int. Cl.[6] .............................. G08C 21/00; G09G 5/00
[52] U.S. Cl. ............................ 178/18.07; 178/18.01; 178/18.03; 178/19.03; 178/20.03; 345/173; 345/179
[58] Field of Search ................ 178/18.01, 18.03, 178/18.07, 19.01, 19.03, 20.01, 20.03; 345/157, 173, 174, 179, 180, 182

[56] References Cited

U.S. PATENT DOCUMENTS

| | | | |
|---|---|---|---|
| 4,022,971 | 5/1977 | Rodgers | 178/19 |
| 4,631,355 | 12/1986 | Federico | 178/18 |
| 4,736,073 | 4/1988 | Abernethy | 178/19 |
| 4,791,592 | 12/1988 | Burgess | 364/572 |
| 5,053,757 | 10/1991 | Meadows | 340/712 |
| 5,113,042 | 5/1992 | Mletzko | 178/19 |
| 5,179,254 | 1/1993 | McDermott | 178/18 |
| 5,218,174 | 6/1993 | Gray et al. | 178/18 |
| 5,327,163 | 7/1994 | Hashimoto et al. | 345/173 |
| 5,347,589 | 9/1994 | Meeks et al. | 345/179 |
| 5,359,156 | 10/1994 | Chan et al. | 178/19 |
| 5,365,253 | 11/1994 | Cheng et al. | 345/156 |
| 5,397,865 | 3/1995 | Park | 178/18 |

FOREIGN PATENT DOCUMENTS

| | | | |
|---|---|---|---|
| 2205164 | 11/1988 | United Kingdom | G08C 21/00 |

*Primary Examiner*—Vijay Shankar
*Attorney, Agent, or Firm*—Paul J. Maginot; Wayne P. Bailey

[57] ABSTRACT

A digitizing panel responsive to a signal transmitted from a stylus for generating stylus position information is disclosed. The digitizing panel includes a coordinate generator for determining coordinate data indicative of a position of the stylus relative to the digitizing panel, a velocity calculator for determining a stylus velocity value based on the coordinate data, a mechanism for determining a filter bandwidth value based on the stylus velocity value, a filter for filtering the coordinate data wherein the filter has a predetermined bandwidth characteristic, and a mechanism for varying the predetermined bandwidth characteristic based on the filter bandwidth value. A method for filtering position data of a stylus associated with a digitizing panel is also disclosed.

23 Claims, 8 Drawing Sheets

FIG. 8

```
float vel;              /*stylus velocity*/
float w0;               /*previous reported low-pass filter cut-off frequency/bandwidth*/
float w0buff;           /*present low pass filter cut-off frequency determined*/
float w0min;            /*low limit for the filter bandwidth*/
float xbuff, ybuff;     /*buffers for x and y coordinates*/
int pcount;             /*coordinate sample counter*/
int CPPS;               /*sampling rate*/
float x, y;             /*present values of x and y coordinates expressed as a fraction*/
                        /*of the display width and/or length*/
float delta;            /*maximum distance between digital ink and tip of stylus*/
                        /*expressed as a fraction of the display width and/or length*/

(pcount>=10)
{
                /*calculate velocity*/
    vel = sqrt((x - xbuff) * (x - xbuff) + (y - ybuff) * (y - ybuff))/pcount;

/*calculate corresponding filter bandwidth*/
    w0buff = vel * CPPS/delta;

/*exponentially decay previous bandwidth value*/
    w0 *= pow(0.9704, pcount);

/*if new bandwidth is higher than decayed bandwidth use new*/
                /*bandwidth, otherwise use decayed bandwidth*/
    w0 = w0buff > w0? w0buff : w0;

/*limit bandwidth from low side*/
    w0 = w0 > w0min? w0 : w0min;

/*update coordinate buffers*/
    xbuff = x;
    ybuff = y;

/*reset counters*/
    pcount = 0
}
```

FIG. 11

```
float x1, y1;          /*previous x, y coordinate values*/
float fx1, fy1;        /*previous filtered output coordinates from low-pass filters*/
int CPPS;              /*sampling rate*/
float T = 1/CPPS;      /*time period for sampling rate*/

/*calculate low pass filtered x, y coordinates*/
        fx = filter(w0, x, x1,fx1);
        fy = filter(w0, y, y1,fy1);

/*update buffers*/
        x1 = x;
        fx1 = fx;
        y1 = y;
        fy1 = fy;

float filter (float w0, float x, float x1, float y1)
        float y;
        static float a1, a2, b1;

/*calculate filter coefficients*/
        a1 = 1/(1 + 2.0/(w0 * T));
        a2 = 1/(1 + 2.0/(w0 * T));
        b1 = (1 - 2.0/(w0 * T))/(1 + 2.0/(w0 * T));

/*calculate filtered output*/
        y = a1 * x + a2 * x1 - b1 * y1;
        return(y);
```

METHOD AND APPARATUS FOR REDUCING NOISE IN AN ELECTROSTATIC DIGITIZING TABLE

BACKGROUND OF THE INVENTION

The present invention relates generally to digitizing tablets, and more particularly to a method and apparatus for reducing noise in an electrostatic digitizing tablet or panel associated with a computer.

Electrostatic digitizing panels having a resistive layer covered with a non-conductive plate such as glass, are known in the art. The known electrostatic digitizing tablets may operate in one of two modes, namely a touch mode or a pen mode. When operating in the touch mode, a computer is conventionally configured so as to bias the resistive layer with an AC signal. An object such as a user's finger that approaches and contacts the non-conductive plate acts as a load that is capacitively coupled to the resistive layer. The capacitively coupled load causes electric current to flow through the corners of the resistive layer. The computer may determine a Cartesian coordinate (X, Y) position of an object relative to the digitizing panel, based on the current flow in each of the corners of the resistive layer in a manner known to one of ordinary skill in the art. More particularly, the position of the stylus relative to the digitizing panel may be determined based upon a ratio of the corner currents or signals that flow through the corners of the resistive layer due to the object being capacitively coupled to the resistive layer.

When operating in the pen mode, the computer is conventionally configured so as to be receptive to a signal transmitted from a hand-held pen or stylus. In particular, a stylus typically includes a battery portion which supplies power to an oscillator portion for stimulating a coil associated with a transmitter portion to transmit an AC signal from a tip of the stylus. The AC signal may be transmitted from the stylus tip when the tip contacts an object or surface such as the non-conductive plate associated with the digitizing panel.

The transmitted AC signal is typically capacitively coupled to the resistive layer associated with the electrostatic digitizing panel. The capacitively coupled AC signal induces an electric current flow through each of the corners of the resistive layer in a known manner. As in the touch mode, the position of the stylus relative to the digitizing panel may then be determined in a known manner. The stylus position determination in the pen mode is based upon a ratio of the corner currents or signals that flow through the corners of the resistive layer due to the AC signal transmitted from the stylus.

One of the problems existing with known electrostatic digitizing tablets is the presence of external noise that may be induced onto the corner signals which detrimentally affects the resolution of the digitizing panel (i.e. the ability of the digitizing panel to accurately report the position of the object relative to the digitizing panel, to a host processor such as a CPU). For instance, noise may cause variances in the reported position coordinates of an object even though the object is held stationary or moved slowly relative to the digitizing panel. The position variances of the object may be manifested by the activation of a relatively large number of display screen pixels adjacent to or surrounding the actual position of the object relative to the digitizing panel.

It should be appreciated that the presence of external noise on the corner signals primary affects the performance of the computer while operating in pen mode. This is because in pen mode, a user is typically using the stylus to enter written data into the computer. Thus, ability of the computer to accurately replicate the written information on an LCD screen with digital ink (i.e. activated liquid crystal display pixels) is important. In contrast, the user typically does not enter data in touch mode, but uses a finger or other object to select from menu-type options displayed on the display screen. It should be appreciated that the selection-type commands to do require the same degree of accuracy in determining the position of the object relative to the digitizing panel.

Known methods for addressing noise problems associated with operating a computer in pen mode typically involve the use of low-pass filters to filter out the noise components or signals. Typically, the narrower the pass band characteristic of a low-pass filter, the greater the noise rejection of the low-pass filter and the better the resolution of the digitizing panel. The resolution of the digitizing panel is an important performance criteria particularly when a stylus is moved relatively slowly across a digitizing panel. That is, it is particularly important for the computer to accurately replicate the written information on an LCD screen when a stylus is moved relatively slowly across a digitizing panel. However, one problem associated with using a low-pass filter having a narrow pass band is that the digital ink tends to lag the instantaneous position of a stylus that is being moved relatively quickly across the digitizing panel.

What is needed therefore is an electrostatic digitizing panel that compensates for, or otherwise filters out external noise signal components which would otherwise detrimentally affect a reported position coordinate of stylus, while at the same time permitting digital ink to closely track the position of the stylus being moved relative to the digitizing panel.

SUMMARY OF THE INVENTION

In accordance with one embodiment of the present invention, there is provided a digitizing panel including a mechanism for determining a velocity of a stylus relative to the digitizing panel, a filter for filtering stylus position data to remove unwanted noise components wherein the filter has a predetermined bandwidth characteristic, and a mechanism for varying the predetermined bandwidth characteristic based on the velocity of the stylus.

Pursuant to another embodiment of the present invention, there is provided a method for filtering position data of a stylus associated with a digitizing panel. The method includes the steps of filtering the position data through a filter to remove unwanted noise components, increasing a bandwidth characteristic of the filter when a velocity of the stylus increases relative to the digitizing panel, and decreasing the bandwidth characteristic of the filter when the velocity of the stylus decreases relative to the digitizing panel.

Pursuant to another embodiment of the present invention, there is provided a digitizing panel responsive to a signal transmitted from a stylus for generating stylus position information. The digitizing panel includes a coordinate generator for determining coordinate data indicative of a position of the stylus relative to the digitizing panel, a velocity calculator for determining a stylus velocity value based on the coordinate data, a mechanism for determining a filter bandwidth value based on the stylus velocity value, a filter for filtering the coordinate data wherein the filter has a predetermined bandwidth characteristic, and a mechanism for varying the predetermined bandwidth characteristic based on the filter bandwidth value.

It is therefore an object of the present invention to provide a new and useful method for reducing noise in an electrostatic digitizing panel.

It is also an object of the present invention to provide an improved method for reducing noise interference in an electrostatic digitizing panel.

It is another object of the present invention to provide a new and useful digitizing panel for reducing noise in an electrostatic digitizing panel.

It is yet another object of the present invention to provide an improved digitizing panel for reducing noise in an electrostatic digitizing panel.

It is yet another object of this invention to provide a new and useful digitizing panel which accurately reports position coordinates of a stylus relative to the digitizing panel.

It is yet another object of the present invention is to provide a new and useful digitizer which permits digital ink to closely track the position of a stylus being moved relative to the digitizing panel.

The above and other objects, features, and advantages of the present invention will become apparent from the following description and the attached drawings.

BRIEF DESCRIPTION OF THE DRAWINGS

FIG. 8 is a pseudo-code listing for implementing the velocity calculator shown in FIG. 4;

FIG. 11 is a pseudo-code listing for implementing the low-pass filters shown in FIG. 4.

DETAILED DESCRIPTION OF THE PREFERRED EMBODIMENTS

Figure 1:
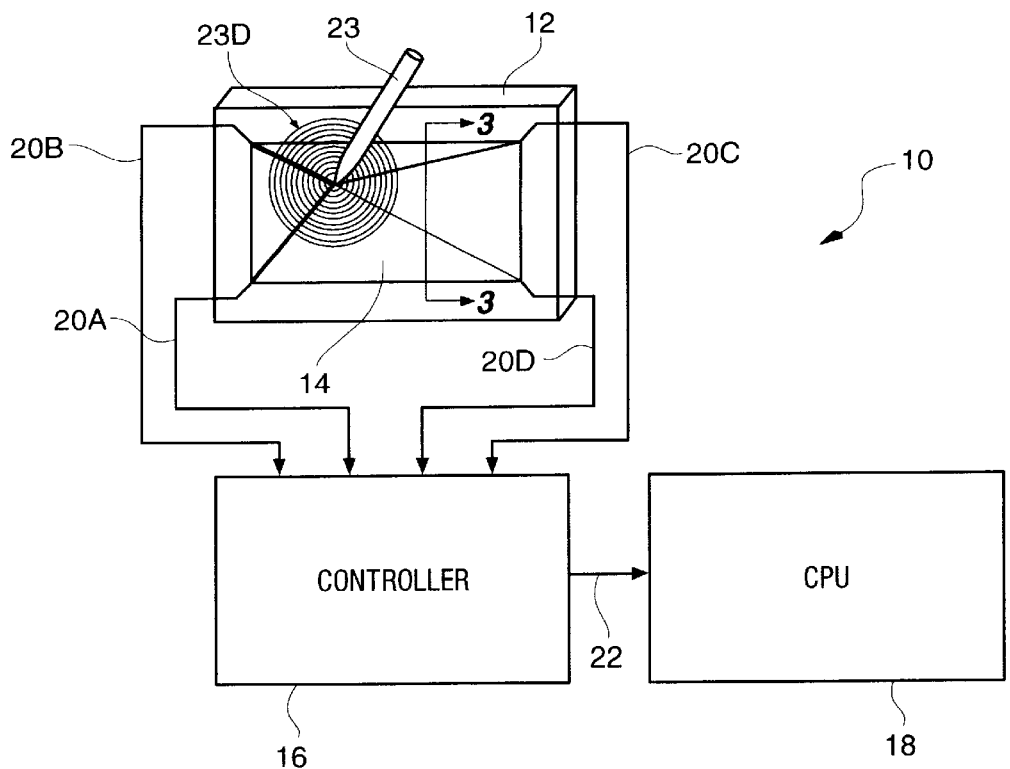
FIG. 1 is a functional block diagram of a computer having a digitizing panel which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a functional block diagram of a computer 10 such as a notebook or mobile computer which incorporates the features of the present invention therein. The computer 10 includes a base or frame 12, an electrostatic digitizing tablet or panel 14 secured to the frame 12, a controller 16, and a conventional central processing unit (CPU) 18. The digitizing panel 14 is operatively connected to the controller 16 through corner wires 20a–20d, and the controller 16 is operatively connected to the CPU 18 through a serial data line 22 such as a serial port.

Figure 2:
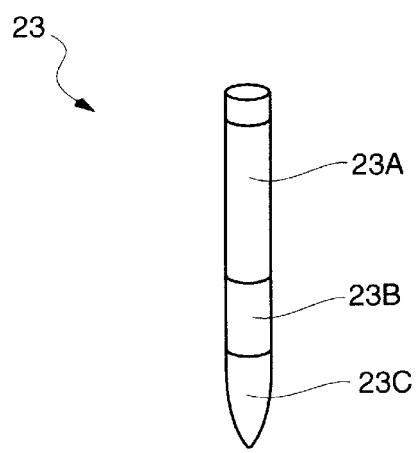
FIG. 2 is a perspective view of a stylus shown in FIG. 1.

A conventional hand-held pen or stylus 23 is used to input data into the computer 10 in a known manner, when the computer 10 is operating in a pen mode as described further below. Referring to FIG. 2, the stylus 23 may be a cordless-type stylus having at least a battery portion 23a, oscillator portion 23b and transmitter portion 23c. The battery portion 23a supplies power to the oscillator portion 23b which then stimulates a coil (not shown) associated with the transmitter portion 23c, to transmit an AC signal 23d (FIG. 1). In the embodiment being described, the signal 23d has a frequency of approximately 125 KHz.

Figure 3:
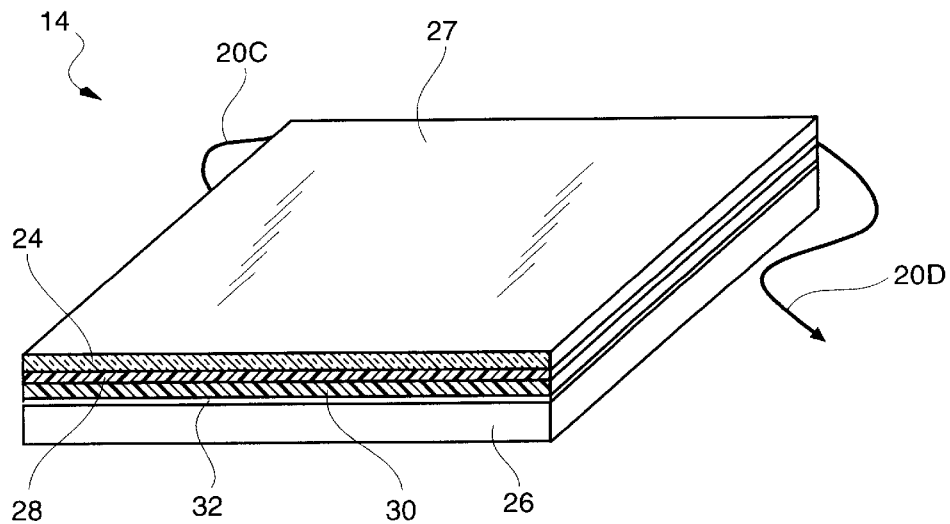
FIG. 3 is a perspective view of the digitizing panel taken along the line 3—3 in FIG. 1.

The electrostatic digitizing panel 14 may include several layers of known material as shown in FIG. 3. In the embodiment being described, a glass layer 24 protects an LCD (liquid crystal display) screen 26 which is disposed below the glass layer 24. An upper surface 27 of the glass layer 24 defines a writing/touching surface for an object such as the stylus 23 or a user's finger (not shown). A lower surface of the glass layer 24 has a layer 28 of an active sensor material applied thereto. In the embodiment being described, the active sensor material is a thin coating of transparent indium-tin-oxide (ITO) which is typically used in electrostatic digitizing panel applications.

Each corner wire 20a–20d is electrically connected to a respective corner of the active ITO layer 28 for carrying current flow generated as a result of an object contacting the glass layer 24 as described further below. A polyester spall shield 30 is attached to the underside of the active ITO layer 28 to prevent the glass surface 24 from shattering if ever broken. A lower surface of the spall shield 30 may have an active ITO shield layer (not shown) applied thereto. The active ITO shield layer forms an electrical shield reducing noise coupling from the LCD screen 26 to the active ITO layer 28. An air gap 32 separates the lower surface of the spall shield 30 from an upper surface of the LCD screen 26.

The computer 10 may operate in one of two modes, namely a touch mode and a pen mode. In the touch mode of operation, the computer 10 is conventionally configured so as to bias the active ITO layer 28 with an AC signal from the controller 16 in a known manner. In particular, the controller 16 applies a 125 KHz biasing voltage to each corner of the active ITO layer 28 through the corner wires 20a–20d. As long as an object is not approaching the digitizing panel 14, the computer 10 is in a quiescent state and a finite amount of AC offset current may flow through the corner wires 20a–20d due to loading effects caused by stray or parasitic capacitance between the active ITO layer 28 and any metal components of the computer 10 proximate the active ITO layer 28.

When an object does approach the digitizing panel 14, the object increasingly acts as a capacitive load that is coupled to the active ITO layer 28. An object that is capacitively coupled to the active ITO layer 28 acts as a load on the active ITO layer 28 which results in current flow through each of the corners of the active ITO layer 28, and through the corner wires 20a–20d. The controller 16 may determine a Cartesian coordinate (X, Y) position of an object such as a user's finger relative to the digitizing panel 14, based on the current flow in each of the corner wires 20a–20d in a manner known to one of ordinary skill in the art.

In the pen mode of operation, the computer 10 is conventionally configured so as to be receptive to the signal transmitted from the stylus 23. In particular, a current flow is generated in each of the corner wires 20a–20d in response to the signal transmitted from the stylus 23. The controller 16 may determine a Cartesian coordinate (X, Y) position of the stylus relative to the digitizing panel 14, based on the current flow in each of the corner wires 20a–20d in a manner known to one of ordinary skill in the art.

The magnitude of current flow through each of the corners of the active ITO layer 28 (and in each of the corner wires 20a–20d) due to an object (stylus or finger) which is capacitively coupled to the active ITO layer 28, is proportional to the conductivity of the active ITO layer 28 between each corner of the active ITO layer 28 and the object at a particular position on the glass layer 24 as shown in FIG. 1. More particularly, the relative thickness of the lines extending from the object position to each corner of the active ITO layer 28, is indicative of the magnitude of current flow through the respective corners of the active ITO layer 28 due to the position of the object relative to the active ITO layer 28.

Thus, the closer the object is to a particular corner of the active ITO layer 28, the greater the conductivity of the active ITO layer 28 and the greater the current flow through that corner, as depicted by the relative thickness of lines extending between the object position and each of the corners of the active ITO layer 28. Likewise, the farther the object is from a particular corner of the active ITO layer 28, the lower the conductivity of the active ITO layer 28, and the lower the current flow through that corner. What follows hereafter is a discussion limited solely to the pen mode of operation for the computer 10.

Figure 4:
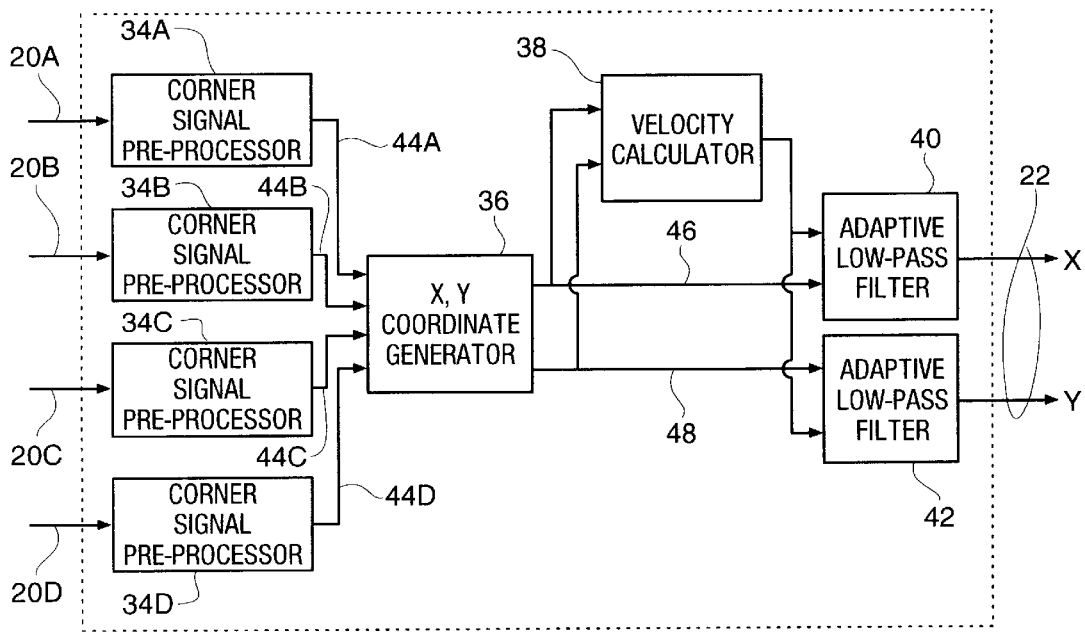
FIG. 4 is a block diagram of a controller shown in FIG. 1.

Referring now to FIG. 4, there is shown a simplified functional block diagram of the controller 16. In particular, the controller 16 includes a number of corner signal processors 34a–34d, an X, Y coordinate generator 36, a velocity calculator 38 and two adaptive low-pass filters 40, 42. The corner signal processors 34a–34d conventionally convert the current flowing through the respective corner wires 20a–20d into analog voltage signals. The analog voltage signals have amplitudes which are indicative of the magnitude of current flowing through the respective corner wires 20a–20d. The current flowing through the corner wires 20a–20d is substantially attributable to the stylus 23 contacting the digitizing panel 14 as previously described above.

In addition, the corner signal processors 34a–34d typically filter, rectify and convert the analog voltage signals into digital values in a known manner prior to placing the digital values on lines 44a–44d. In the embodiment being described, the analog voltage signals are converted into digital values at a sampling rate of approximately 100 samples/second. In addition, each of the corner signal processors 34a–34d conventionally supplies an AC signal to the respective corner wires 20a–20d for stimulating the active ITO sensor layer 28 when the computer 10 is operated in the touch mode. The digital values on lines 44a–44d have binary representations that are indicative of the magnitude of current flowing through the respective corner wires 20a–20d.

The X, Y coordinate generator 36 inputs the digital values on lines 44a–44d for use in determining the Cartesian coordinates (X, Y) of the object relative to the digitizing panel 14 in a known manner. In particular, the position of the stylus 23 relative to the digitizing panel 14 may be determined based upon a ratio of the digital values which represent the magnitudes of current flow through the corners of the active ITO layer 28 due to the presence of the AC signal 23d transmitted from the stylus 23.

In the embodiment being described, the resulting X-coordinate value is expressed as a fraction of the width of the digitizing panel 14, and the resulting Y-coordinate value is expressed as a fraction of the height of the digitizing panel 14. The X, Y coordinate values are output from the X, Y coordinate generator 36 on lines 46 and 48, respectively. The X-coordinate value on line 46 is passed to the velocity calculator 38 and the adaptive low-pass filter 40. Likewise, the Y-coordinate value on line 48 is passed to the velocity calculator 38 and the adaptive low-pass filter 42.

The velocity calculator 38 calculates or otherwise determines the velocity of stylus movement relative to the digitizing panel 14. In particular, the velocity of the stylus 23 is calculated based upon a change in position of the stylus 23 as determined from the X, Y coordinate values received from the X, Y coordinate generator 36 as described further below. The velocity calculator 38 also determines an upper cut-off frequency or bandwidth value for the low-pass filters 40, 42, based on the velocity of stylus as described further below.

Figure 5:
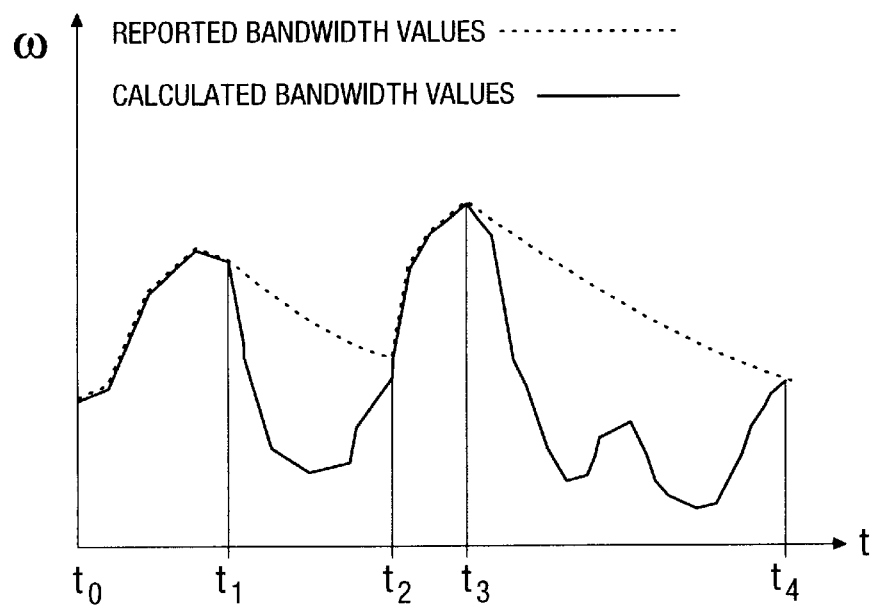
FIG. 5 shows a stylus velocity and reported bandwidth vs. time graph for a velocity calculator shown in FIG. 4.

Referring now to FIG. 5, there is shown a graph of calculated bandwidth values (solid line) and reported bandwidth values (dashed line) vs. time. The calculated bandwidth values continuously track the velocity of the stylus 23 determined in the velocity calculator 38. The bandwidth values reported to the low-pass filters 40, 42 do not continuously track the velocity of the stylus 23. More particularly, the reported bandwidth values increase proportionally with increases in the calculated bandwidth values when the calculated bandwidth values are greater than the reported bandwidth values, such as during time periods $t_0$ to $t_1$ and $t_2$ to $t_3$ as shown in FIG. 5. The problem of digital ink lagging the stylus 23 is minimized by permitting the reported bandwidth values to track increasing stylus velocity values (by tracking increasing calculated bandwidth values).

However, the reported bandwidth values decrease exponentially when the calculated bandwidth values are less than the reported bandwidth values, such as during time periods $t_1$ to $t_2$ and $t_3$ to $t_4$ as shown in FIG. 5. The purpose for delaying the reported bandwidth fall down is to permit the low-pass filters 40, 42 to immediately respond in situations where the velocity of the stylus 23 decreases temporarily before increasing again.

Figure 6:
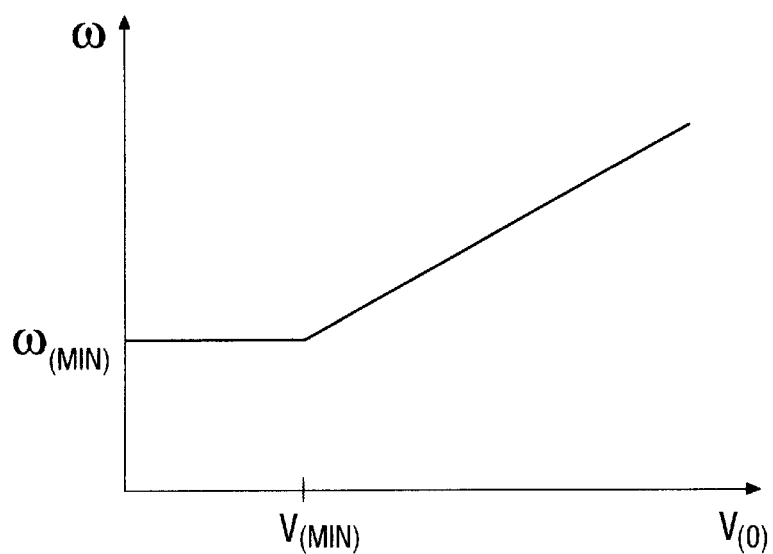
FIG. 6 is a graph showing a bandwidth vs. stylus velocity characteristic for the velocity calculator shown in FIG. 4.

FIG. 6 is a graph showing a reported bandwidth vs. stylus velocity characteristic for the velocity calculator 38. As shown in FIG. 6, when the velocity of the stylus 23 drops below a predetermined minimum velocity threshold ($v_{min}$), the bandwidth of the low-pass filters 40, 42 is limited to a minimum bandwidth value ($\omega_{min}$). The performance, and more particularly, the resolution of the digitizing panel 14 is improved when the bandwidth of the low-pass filters 40, 42 is limited to ($\omega_{min}$) when the stylus 23 is either not moving, or moving at a velocity less than ($v_{min}$) across the digitizing panel 14. A narrower bandwidth (e.g. $\omega_{min}$) results in a lower pass band which permits the low-pass filters 40, 42 to reject more frequencies (e.g. lower frequency noise components) than if the bandwidth was greater, thus improving the resolution of the digitizing panel 14 at lower stylus velocities.

Likewise, when the stylus velocity increases above ($V_{min}$), the bandwidth of the low-pass filters 40, 42 increases proportionally to the velocity increase. In contrast, the bandwidth of the low-pass filters 40, 42 decrease exponentially when the stylus velocity decreases. As mentioned above, the performance and/or resolution of the digitizing panel 14 is not as critical when the stylus 23 is moved relatively quickly across the digitizing tablet. Thus, the bandwidth of the low-pass filters 40, 42 is increased so as to prevent the digital ink from disadvantageously lagging behind the stylus position as the stylus is moved relatively quickly across the digitizing panel 14.

In the embodiment being described, the velocity calculator 38 is implemented as a software routine which determines the velocity of the stylus 23, and determines a bandwidth value to report to the low-pass filters 40, 42, based on every tenth set of X, Y coordinate values output from the X, Y coordinate generator 36 on lines 46, 48. It should be appreciated that the sampling rate of the velocity calculator 38 could be adjusted up or down if desired. however, a 1/10 sampling rate permits the stylus velocity to be accurately tracked while at the same time, prevents spurious or instantaneous noise spikes from influencing the stylus velocity determination.

Figure 7:
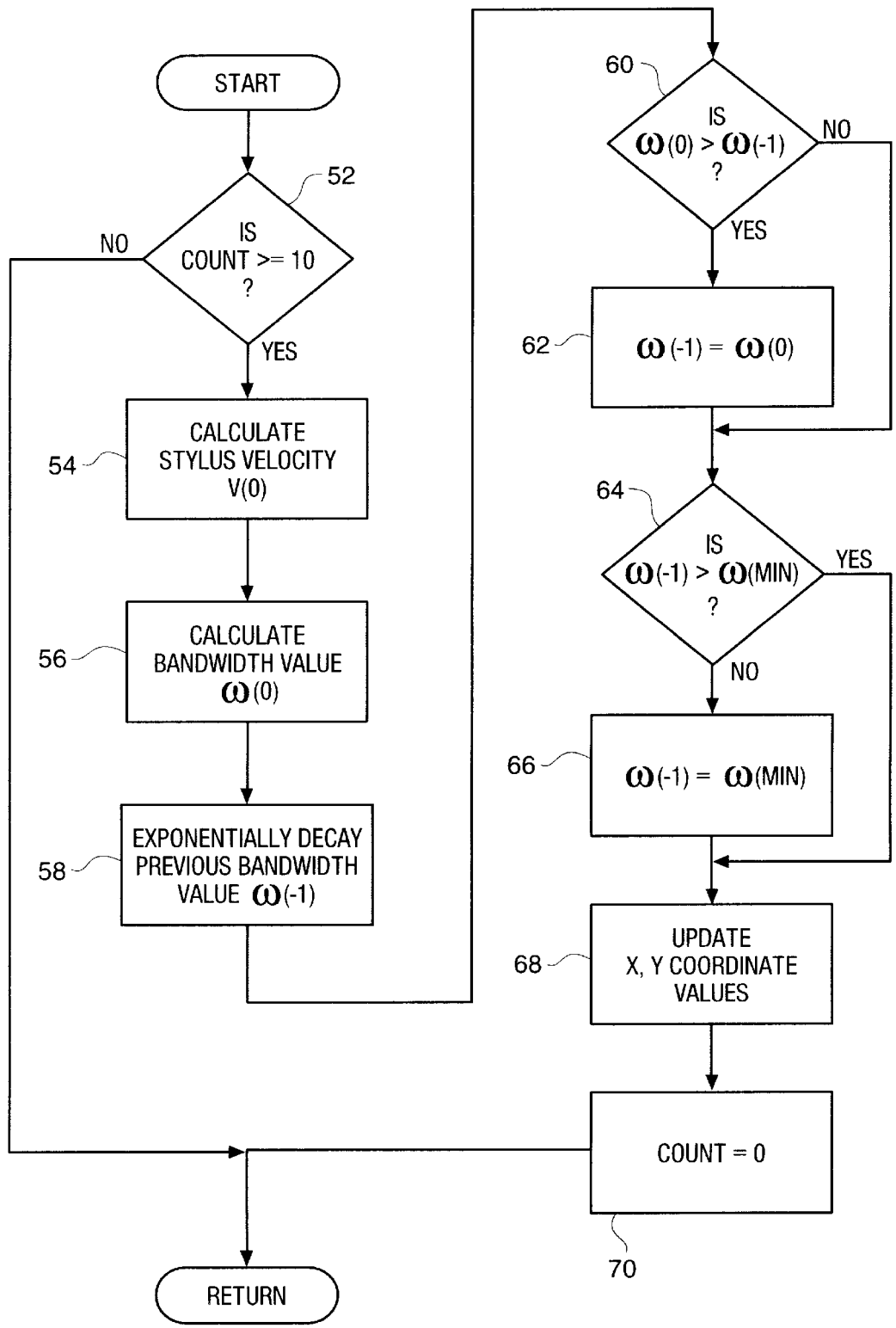
FIG. 7 is a flow chart for the velocity calculator shown in FIG. 4.

FIG. 7, shows an exemplary flow chart 50 for implementing the velocity calculator 38 as a software/firmware routine. Initially, the routine determines whether a counter variable (count) is greater than or equal to a predetermined value (e.g. 10) in step 52. If the result of step 52 is no, the subroutine ends and control is returned to a main routine (not shown). If the result of step 52 is yes, the routine advances to step 54.

In step 54, a velocity of the stylus 23 is determined by calculating the distance between the X, Y coordinate values presently on lines 46, 48, and the X, Y coordinate values that were on lines 46, 48 during the previous iteration of the routine, and dividing the result by the time elapsed between the samples. More particularly, a velocity variable ($v_0$) may be determined from equation (1):

$$v_0 = \frac{\sqrt{(x_0 - x_{-1})^2 + (y_0 - y_{-1})^2}}{count} \quad (1)$$

where $v_0$ represents the velocity of the stylus 23 expressed in units of distance/sample, $x_0$ and $y_0$ are variables which represent the present X, Y coordinate values on lines 46, 48, $x_{-1}$ and $y_{-1}$ are variables which represent the previous X, Y coordinate values that were on lines 46, 48 during the previous iteration of the routine, and the count variable represents the number of X, Y coordinate value pairs that were output from the X, Y coordinate generator 36 on lines 46, 48 since the count variable was reset. The routine then advances to step 56.

In step 56, a present bandwidth variable ($\omega_0$) is determined from equation (2):

$$\omega_0 = v_0 \left( \frac{cpps}{delta} \right) \quad (2)$$

where $\omega_0$ is expressed in rad/sec, $v_0$ represents the stylus velocity value determined in step 54, cpps is a variable indicative of the system sampling rate (e.g. 100 samples/second), and delta is a user selectable variable which is indicative of the maximum permissible distance that the digital ink should lag the tip of the stylus. The delta variable is expressed as a fraction of the digitizing panel width and/or length. The routine then advances to step 58.

In step 58, a bandwidth variable ($\omega_{-1}$) that was reported to the low-pass filters 40, 42 during the previous iteration of the routine is exponentially decremented by a constant (K) according to equation (3):

$$\omega_{-1} = \omega_{-1}(K) \quad (3)$$

where ($\omega_{-1}$) is in units of rad/sec. In the embodiment being described, the constant $K = 0.9704^{(count)} = 0.7405$. However, it should be appreciated that the constant (K) could be set to other values where appropriate. The routine then advances to step 60.

The routine then advances to step 60 to determine whether the bandwidth variable ($\omega_0$) is greater than the bandwidth variable ($\omega_{-1}$). If the result of step 60 is yes, then the routine advances to step 62 where the bandwidth variable ($\omega_{-1}$) is updated with (i.e. set equal to) the bandwidth variable ($\omega_0$). If the result of step 60 is no, the routine advances directly to step 64.

The purpose of step 60 is to determine which bandwidth value to report to the low-pass filters, i.e. whether to report the bandwidth variable ($\omega_0$), which is indicative of the present stylus velocity, or to report the previous bandwidth variable ($\omega_{-1}$) which was exponentially decremented in step 58. More particularly, the value stored in bandwidth variable ($\omega_{-1}$) will be reported to the low-pass filters 40, 42 during the time periods $t_1$ to $t_2$ and $t_3$ to $t_4$ (FIG. 5), and the value stored in the bandwidth variable ($\omega_0$) will be set equal to the bandwidth variable ($\omega_{-1}$) and reported to the low-pass filters 40, 42 during the time periods $t_0$ to $t_1$ and $t_2$ to $t_3$ (FIG. 5). Thus, prior to advancing to step 64, the bandwidth variable ($\omega_{-1}$) represents a bandwidth value indicative of either (1) the previously reported bandwidth value which has been exponentially decremented, or (2) the present velocity of the stylus.

In step 64, a determination is made whether the bandwidth variable ($\omega_{-1}$) is greater than a user selectable minimum bandwidth variable ($\omega_{min}$). If the result of step 64 is no, then the routine advances to step 66 where the bandwidth variable ($\omega_{-1}$) is updated with (i.e. set equal to) the minimum bandwidth variable ($\omega_{min}$). If the result of step 64 is yes, the routine advances directly to step 68. Referring again to FIG. 6, the purpose of step 64 is to determine whether the value stored in the bandwidth variable ($\omega_{-1}$) has dropped below ($\omega_{min}$). If so, ($\omega_{min}$) is copied into ($\omega_{-1}$) in step 66 and reported to the low-pass filters 40, 42.

In step 68, the $x_{-1}$ variable is set equal to the $x_o$ variable, and the $y_{-1}$ variable is set equal to the $y_0$ variable for use in determining the velocity variable ($v_0$) during the next iteration of the routine. The routine then advances to step 70, where the counter variable (count) is reset before the present iteration of the routine ends and control passes back to the main routine. FIG. 8 shows an exemplary pseudo-code listing which implements the velocity calculator 38 flow chart shown in FIG. 7.

The low-pass filters 40, 42 are implemented as first order digital low-pass filters having coefficients (a1, a2, b1) which are dynamically modifiable. The low-pass filters 40, 42 each have a transfer function (in the Z-transform domain) as shown by equation (4):

$$H(z) = \frac{a1 + a2(z^{-1})}{1 + b1(z^{-1})} \quad (4)$$

Figure 9:
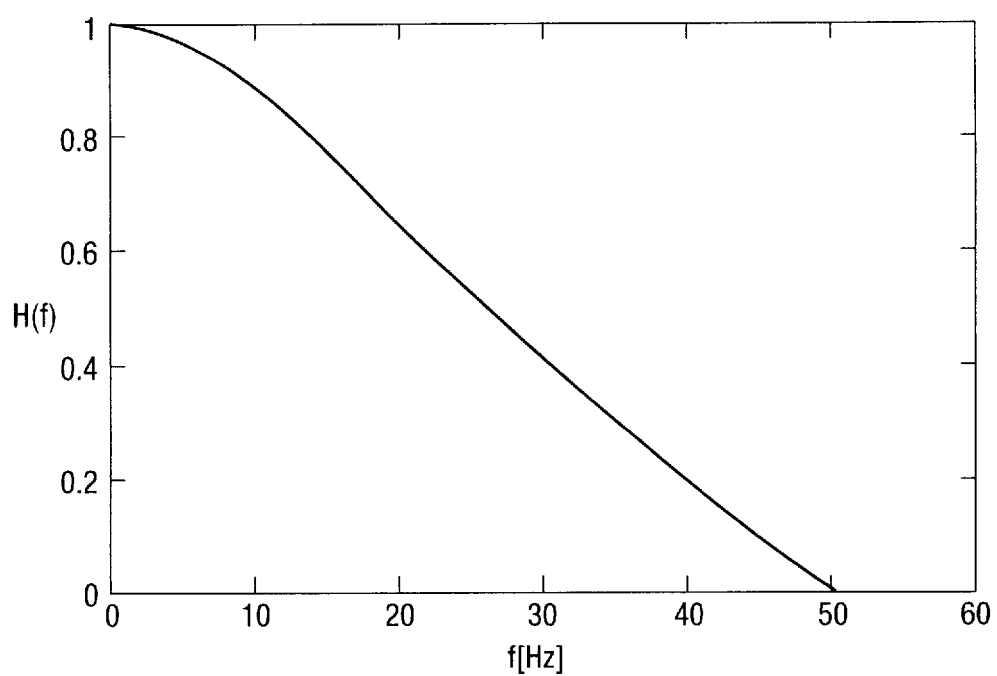
FIG. 9 is a graph showing a frequency response curve for the low-pass filters shown in FIG. 4.

Equation (4) results in the frequency response curve shown in FIG. 9. In particular, FIG. 9 shows a graph of the amplitude of the output signals from the low-pass filters 40, 42 vs. frequency where the input signals to the low-pass filters 40, 42 are assumed to have an amplitude equal to 1.0. That is, the graph shows a ratio of the output and input amplitudes where |H(f)| is the module of the transfer function of equation (4). Thus, the graph shows only the relationship between the input and output amplitudes and does not show their phase relationship. The frequency response curve of FIG. 9 corresponds to a reported bandwidth variable ($\omega_{-1}$) of 125.66 rad/s (20 Hz) with a sampling period (T) of 0.01 sec.

Figure 10:
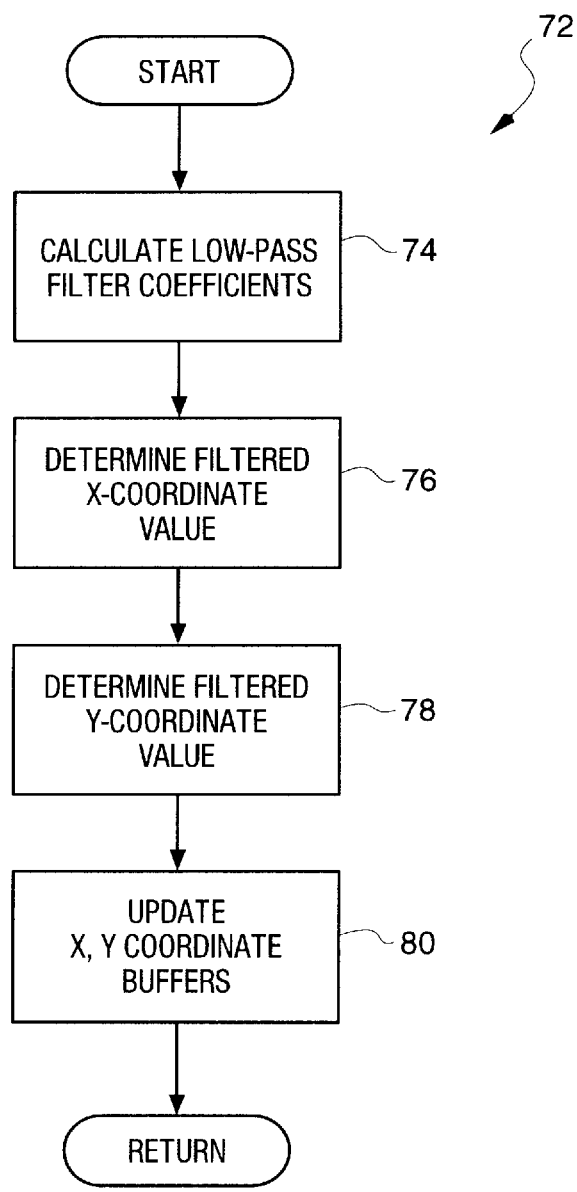
FIG. 10 is a flow chart for the low-pass filters shown in FIG. 4.

In the embodiment being described, the low-pass filters 40, 42 are implemented as a software/firmware routine. However, it should be appreciated that low-pass filters having the same transfer function as equation (4) could be implemented in hardware if so desired. FIG. 10 shows an exemplary flow chart 72 for implementing the low-pass filters 40, 42 as a software/firmware routine.

Initially, the routine determines the low-pass filter coefficients a1, a2 and b1 in step 74. The low-pass filter coefficients a1, a2 and b1 may be determined from equations (5) and (6), respectively:

$$a1 = a2 = \frac{1}{1 + \frac{2}{\omega_{-1}(T)}} \quad (5)$$

$$b1 = \frac{1 - \frac{2}{\omega_{-1}(T)}}{1 + \frac{2}{\omega_{-1}(T)}} \quad (6)$$

where ($\omega_{-1}$) is the bandwidth variable reported to the low-pass filters 40, 42 from the velocity calculator 38, and T is the sampling period. The routine then advances to step 76.

In step 76, the low-pass filtered X-coordinate output value from low-pass filter 40 is determined. The transfer function shown in equation (4) can be realized by equation (7):

$$y = a1(x) + a2(x1) - b1(y1) \quad (7)$$

where y is the low-pass filtered X-coordinate output value from the low-pass filter 40, x is the present X-coordinate value on line 46, x1 is the previous X-coordinate value on line 46, and y1 is the previously filtered X-coordinate output value from the low-pass filter 40. The routine then advances to step 78.

In step 78, the low-pass filtered Y-coordinate output value is determined in accordance with equation (7), where y is the low-pass filtered Y-coordinate output value from the low-pass filter 42, x is the present Y-coordinate value on line 48, x1 is the previous Y-coordinate value on line 48, and y1 is the previously filtered Y-coordinate output value from the low-pass filter 42. The routine then advances to step 80.

In step 80, a plurality of coordinate buffers are updated for use in determining the filtered X, Y coordinate output values during the next iteration of the routine. The present iteration of the routine ends and control passes back to the main routine. FIG. 10 shows an exemplary pseudo-code listing for implementing equations (5–7).

What has been described above is an electrostatic digitizing panel that compensates for, or otherwise filters out external noise signal components which would otherwise detrimentally affect a reported position coordinate of stylus, while at the same time permitting digital ink to closely track the position of the stylus being moved relative to the digitizing panel.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A digitizing panel comprising:
   means for determining a velocity of a stylus relative to the digitizing panel;
   a filter for filtering said stylus position data, said filter having a bandwidth characteristic;
   means for varying said bandwidth characteristic based on said velocity of said stylus; and
   means for generating said stylus position data at a first predetermined rate,
   wherein said means for determining includes (i) means for sampling said stylus position data at a second predetermined rate to generate present position data and previous position data, and (ii) means for determining a distance between said presently sampled coordinate data and said previously sampled coordinate data.

2. The digitizing panel of claim 1, wherein said filter is a low-pass filter.

3. The digitizing panel of claim 1, wherein said means for varying includes:
   means for calculating filter coefficients of said filter based on said velocity of said stylus.

4. The digitizing panel of claim 1, wherein said means for varying said bandwidth characteristic includes:
   means for decreasing said bandwidth characteristic at a first rate when said stylus velocity value decreases at a second rate, said first rate being slower than said second rate.

5. The digitizing panel of claim 1, wherein said means for varying said bandwidth characteristic includes:
   means for exponentially decreasing said bandwidth characteristic when said stylus velocity value decreases.

6. A method for filtering position data of a stylus associated with a panel, comprising the steps of:
   filtering the position data through a filter;
   modifying bandwidth characteristics of the filter based on velocity of the stylus relative to the panel;
   sampling the position data at a predetermined sampling rate to generate present position data and previous position data;
   determining a distance between the present positioned data and the previous position data; and
   dividing the distance by a sampling time period to determine the velocity of the stylus.

7. The method of claim 6, further including the step of:
   passing the filtered position data to a processor associated with a computer for updating a position of the stylus on a display screen.

8. The method of claim 6, wherein the modifying step includes the step of:
   decreasing said bandwidth characteristic at a first rate when said stylus velocity value decreases at a second rate, said first rate being slower than said second rate.

9. The method of claim 6 wherein the modifying step includes the step of:
   decreasing the bandwidth characteristic of the filter exponentially when the velocity of the stylus decreases.

10. A method for filtering position data of a stylus associated with a digitizing panel, comprising the steps of:
    filtering the position data through a filter;
    increasing a bandwidth characteristic of the filter when a velocity of the stylus increases relative to the digitizing panel;
    decreasing the bandwidth characteristic of the filter when the velocity of the stylus decreases relative to the digitizing panel;
    sampling the position data at a predetermined sampling rate to generate present position data and previous position data;
    determining a distance between the present position data and the previous position data; and dividing the distance by a sampling time period to determine the velocity of the stylus.

11. The method of claim 10, wherein the filter is a low-pass filter.

12. The method of claim 10, wherein the increasing step includes the step of:

increasing the bandwidth characteristic of the filter in proportion to the increase in velocity of the stylus.

13. The method of claim 10, wherein the decreasing step includes the step of:

decreasing the bandwidth characteristic of the filter exponentially when the velocity of the stylus decreases.

14. The method of claim 10, wherein the filter has predetermined filter coefficients, and the increasing step includes the step of:

varying the filter coefficients based on the velocity of the stylus.

15. The method of claim 10, wherein the filter has predetermined filter coefficients, and the decreasing step includes the step of:

varying the filter coefficients based on the velocity of the stylus.

16. The method of claim 10, further including the step of:

passing the filtered position data to a processor associated with a computer for updating a position of the stylus on a display screen.

17. The method of claim 10, wherein the decreasing step includes the step of:

decreasing the bandwidth characteristic of the filter at a first rate when the velocity of the stylus decreases at a second rate, said first rate being slower than said second rate.

18. A digitizing panel responsive to a signal transmitted from a stylus for generating stylus position information, the digitizing panel comprising:

a coordinate generator for determining coordinate data indicative of a position of the stylus relative to the digitizing panel;

a velocity calculator for determining a stylus velocity value based on said coordinate data;

means for determining a filter bandwidth value based on said stylus velocity value;

a filter for filtering said coordinate data, said filter having a predetermined bandwidth characteristic; and means for varying said predetermined bandwidth characteristic based on said filter bandwidth value, said means for varying including means for decreasing said bandwidth characteristic at a first rate when said stylus velocity value decreases at a second rate, wherein said first rate is slower than said second rate.

19. The digitizing panel of claim 18, wherein said filter is a low-pass filter.

20. The digitizing panel of claim 18, wherein said filter is a first order digital low/pass filter.

21. The digitizing panel of claim 18, wherein:

said means for varying further includes means for proportionally increasing said bandwidth characteristic when said stylus velocity value increases, and said means for decreasing said bandwidth characteristic includes means for exponentially decreasing said bandwidth characteristic when said stylus velocity value decreases.

22. The digitizing panel of claim 18, wherein said coordinate data is generated at a first predetermined rate and said stylus velocity value is determined at a second predetermined rate.

23. A digitizing panel responsive to a signal transmitted from a stylus for generating stylus position information, the digitizing panel comprising:

a coordinate generator for determining coordinate data indicative of a position of the stylus relative to the digitizing panel;

a velocity calculator for determining a stylus velocity value based on said coordinate data;

means for determining a filter bandwidth value based on said stylus velocity value;

a filter for filtering said coordinate data, said filter having a predetermined bandwidth characteristic; and means for varying said predetermined bandwidth characteristic based on said filter bandwidth value, wherein said filter has a transfer function of:

$$H(z) = \frac{a1 + a2(z^{-1})}{1 + b1(z^{-1})} .$$

* * * * *